Figures 1, 2:
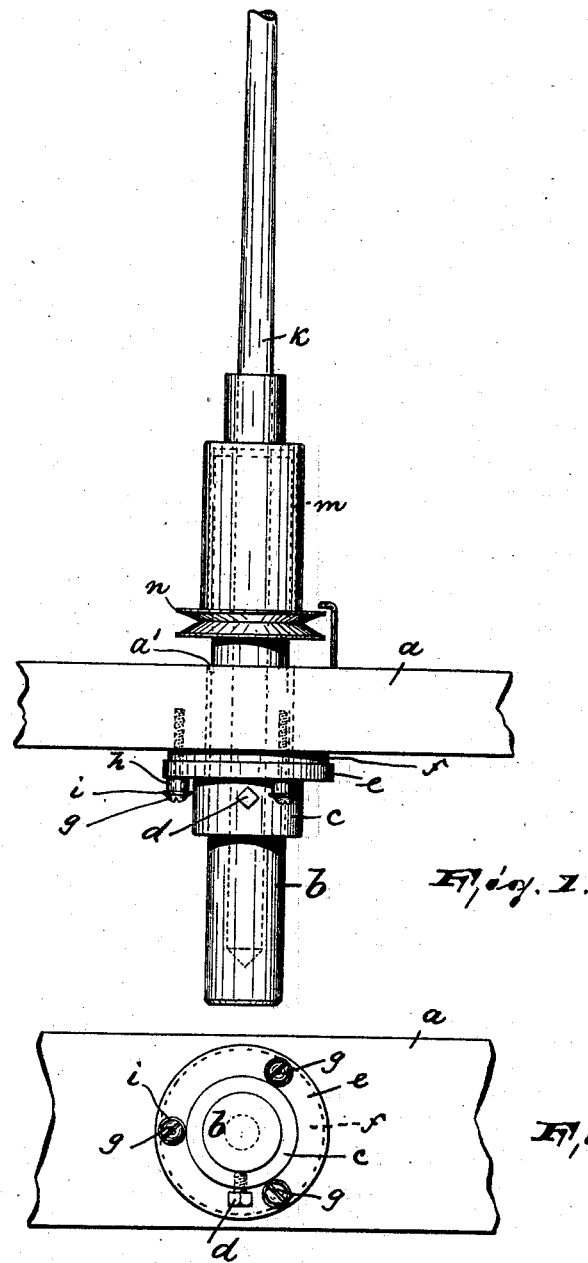

(No Model.)

A. SCHEID.
SPINDLE.

No. 580,718. Patented Apr. 13, 1897.

WITNESSES:
Wm. D. Bell.
Duncan M. Robertson.

INVENTOR:
Adam Scheid
BY Gartner & Co ATTY'S.

UNITED STATES PATENT OFFICE.

ADAM SCHEID, OF HARRISON, NEW JERSEY, ASSIGNOR TO THE DRAPER COMPANY, OF PORTLAND, MAINE.

SPINDLE.

SPECIFICATION forming part of Letters Patent No. 580,718, dated April 13, 1897.

Application filed December 22, 1896. Serial No. 616,644. (No model.)

*To all whom it may concern:*

Be it known that I, ADAM SCHEID, a citizen of the United States, residing in Harrison, county of Hudson, and State of New Jersey, have invented certain new and useful Improvements in Spindles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to spinning-spindles having a flexible connection with the spindle-rail for the purpose of rendering the spindles capable of adjusting themselves to unbalanced loads.

It consists in the detail of construction and combination of parts, substantially as will be hereinafter more fully described, and finally embodied in the clauses of the claim.

In the accompanying drawings, Figure 1 is a front elevation of my improved spindle and its support, and Fig. 2 an underneath view of the same.

The spindle-rail $a$, penetrated by the tube $b$, containing step and bolster bearings for the spindle $k$, having the sleeve $m$ and whirl $n$, are all of the usual and well-known construction. The tube $b$ is of smaller diameter than the opening $a'$ in the rail, which it penetrates. On the tube $b$ and below the rail is adjustably secured, by means of the set-screw $d$, a sleeve $c$, provided with an annular flange $e$, bearing against the flexible washer $f$, arranged on the under side of the rail and surrounding the tube $b$. The annular flange $e$ and also the flexible washer $f$ are penetrated at uniform intervals by a series of headed screws $g$, engaging the rail $a$. Each of said screws $g$ is surrounded by a flexible tube $h$, bearing with its upper edge against the under side of the flange $e$ and with its lower edge against the metallic washer $i$, intermediately arranged on said screw and resting on the head thereof.

From the foregoing it can be seen that the flexibility of the tube $b$ is easily adjusted by means of the screws $g$ and that the center of oscillation can readily be changed by raising or lowering the said tube within the sleeve $c$ and securing it to and within the latter by means of the set-screw $d$.

Having thus described my invention, what I claim as new, and desire to secure by Letters Patent, is—

1. The combination with the spindle-rail, of a sleeve provided with an annular flange, arranged on the under side of the rail, an elastic washer between said flange and the rail, a series of screws penetrating said flange and the washer and secured to the rail, a tube penetrating the rail and adjustably secured within the sleeve, and a whirl-driven spindle in said tube, all said parts, substantially as and for the purposes described.

2. The combination with the spindle-rail, provided with a vertical hole or opening, a sleeve concentrically arranged with said hole and on the under side of the rail and provided with an annular flange, an elastic washer between said flange and the rail, a series of headed screws penetrating the said flange and elastic washer at certain uniform intervals and secured in the rail, an elastic tube surrounding each screw and arranged between the head thereof and the annular flange, a tube adjustably secured within said sleeve, and a whirl-driven spindle in said tube, all said parts, substantially as and for the purposes described.

In testimony that I claim the foregoing I have hereunto set my hand this 17th day of December, 1896.

ADAM SCHEID.

Witnesses:
 ALFRED GARTNER,
 DUNCAN M. ROBERTSON.